United States Patent
Hörder et al.

(10) Patent No.: US 12,286,005 B2
(45) Date of Patent: Apr. 29, 2025

(54) MODULAR ELECTRICAL ENERGY STORAGE SYSTEM STRUCTURE, A METHOD FOR PROVIDING ELECTRICAL ENERGY TO AN ELECTRICAL MOTOR OF A VEHICLE AND A VEHICLE COMPRISING AN ELECTRICAL MOTOR AND THE MODULAR ELECTRICAL ENERGY STORAGE SYSTEM STRUCTURE

(71) Applicant: VOLVO TRUCK CORPORATION, Gothenburg (SE)

(72) Inventors: Jonatan Hörder, Mölndal (SE); Sebastien Ragot, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 274 days.

(21) Appl. No.: 17/757,945

(22) PCT Filed: Dec. 30, 2019

(86) PCT No.: PCT/EP2019/087132
§ 371 (c)(1),
(2) Date: Jun. 24, 2022

(87) PCT Pub. No.: WO2021/136579
PCT Pub. Date: Jul. 8, 2021

(65) Prior Publication Data
US 2023/0015644 A1  Jan. 19, 2023

(51) Int. Cl.
*B60K 1/04* (2019.01)
*B60K 11/06* (2006.01)
(Continued)

(52) U.S. Cl.
CPC ............... *B60K 1/04* (2013.01); *B60K 11/06* (2013.01); *B60L 50/64* (2019.02); *B60L 50/66* (2019.02);
(Continued)

(58) Field of Classification Search
CPC .. B60K 1/04; B60K 11/06; B60K 2001/0438; B60K 150/64; B60K 150/66;
(Continued)

(56) References Cited

U.S. PATENT DOCUMENTS 9,768,478 B2 * 9/2017 Wang ..................... B60L 58/27
10,062,876 B2 * 8/2018 Wuensche ........... H01M 50/296
(Continued)

OTHER PUBLICATIONS

International Search Report and Written Opinion in corresponding International Application No. PCT/EP2019/087132 mailed Sep. 22, 2020 (9 pages).
(Continued)

*Primary Examiner* — Steve Clemmons
(74) *Attorney, Agent, or Firm* — Venable LLP; Jeffri A. Kaminski

(57) ABSTRACT

A modular electrical Energy Storage System structure for powering an electric motor in a vehicle. The modular ESS structure includes two or more electrical energy storage modules, the modular ESS structure extending in a longitudinal direction, in a transverse direction and in a vertical direction, the longitudinal direction coinciding with a driving direction of the vehicle, the two or more electrical energy storage modules being arranged side-by-side in the transverse direction, in the longitudinal direction and/or in the vertical direction and being connected to each other structurally and electrically. The modular ESS structure com-
(Continued)

prises a first mounting interface comprising one or more first connecting members configured for mounting to a vehicle structure.

14 Claims, 3 Drawing Sheets

(51) Int. Cl.
  *B60L 50/60*    (2019.01)
  *B60L 50/64*    (2019.01)
  *B60L 58/26*    (2019.01)
  *H01M 10/613*   (2014.01)
  *H01M 10/625*   (2014.01)
  *H01M 50/204*   (2021.01)
  *H01M 50/249*   (2021.01)
  *H01M 50/502*   (2021.01)

(52) U.S. Cl.
  CPC ............ *B60L 58/26* (2019.02); *H01M 10/613* (2015.04); *H01M 10/625* (2015.04); *H01M 50/204* (2021.01); *H01M 50/249* (2021.01); *H01M 50/502* (2021.01); *B60K 2001/0438* (2013.01); *H01M 2220/20* (2013.01)

(58) Field of Classification Search
  CPC ............ B60K 150/204; B60K 150/249; B60K 158/26; B60K 158/16; H01M 10/613; H01M 10/625; H01M 50/204; H01M 50/249; H01M 50/502; H01M 50/244; H01M 50/258; H01M 50/296; H01M 2220/20; Y02T 10/70
See application file for complete search history.

(56) References Cited

U.S. PATENT DOCUMENTS

| | | | | |
|---|---|---|---|---|
| 10,991,924 | B2* | 4/2021 | Fees ................... | H01M 50/505 |
| 11,247,572 | B2* | 2/2022 | Wuensche ........... | H01M 50/244 |
| 11,901,573 | B2* | 2/2024 | Fees ................... | H01M 50/171 |
| 2012/0068715 | A1* | 3/2012 | Martaeng ............. | G01R 31/382 |
| | | | | 324/434 |
| 2019/0148690 | A1 | 5/2019 | Newman | |
| 2021/0107378 | A1* | 4/2021 | Hirsch ................ | H01M 10/613 |
| 2022/0352591 | A1* | 11/2022 | Chi ..................... | H01M 50/298 |
| 2023/0006300 | A1* | 1/2023 | Schönberger ....... | H01M 50/249 |

OTHER PUBLICATIONS

International Preliminary Report on Patentability in corresponding International Application No. PCT/EP2019/087132 mailed Mar. 4, 2022 (7 pages).

* cited by examiner

MODULAR ELECTRICAL ENERGY STORAGE SYSTEM STRUCTURE, A METHOD FOR PROVIDING ELECTRICAL ENERGY TO AN ELECTRICAL MOTOR OF A VEHICLE AND A VEHICLE COMPRISING AN ELECTRICAL MOTOR AND THE MODULAR ELECTRICAL ENERGY STORAGE SYSTEM STRUCTURE

CROSS-REFERENCE TO RELATED APPLICATIONS

This application is a U.S. National Stage application of PCT/EP2019/087132, filed Dec. 30, 2019 and published on Jul. 8, 2021, as WO 2021/136579, all of which is hereby incorporated by reference in its entirety.

TECHNICAL FIELD

The invention relates to a modular electrical Energy Storage System structure for powering an electric motor in an electric vehicle. The invention also relates to a method for providing electrical energy to an electric motor of a vehicle and an electrical vehicle comprising an electric motor and comprising the modular electrical Energy Storage System structure.

The invention can be applied in cargo transport vehicles, such as for providing drive power in towing truck and semi-trailer combinations, in trucks, buses, recreational vehicles and construction equipment.

BACKGROUND

Electrically powered cargo transport vehicles require an electrical energy source, i.e. an electrical energy storage system, which is capable of delivering the required power and which has sufficient energy capacity. Different types of cargo transport vehicles have different requirements on power and energy capacity of the electrical energy storage system. Some vehicles targeted at long-haul transport of heavy goods may require a larger electrical energy storage system compared to smaller vehicles which are used on shorter routes.

Vehicles for cargo transport often differ in terms of, e.g., wheel base dimension, axle configuration and load capacity. The available space for efficiently mounting battery systems is therefore different between different vehicle types.

To cope with these different requirements, one or several extra electrical energy storage modules can be mounted on vehicles to increase the energy capacity as needed. However, this causes a significant increase in complexity when it comes to the additional routing of the electrical energy storage modules interfaces, such as power, control, ground, and cooling. Furthermore, the batteries in electrical vehicles, and especially in cargo transport vehicles, are often very large and heavy. Therefore, a secure and efficient way of mounting these battery systems to the vehicle frame is needed. The mounting solution should be production friendly on an assembly line where the time spent on each station is limited.

An object of the present disclosure is to provide an improved electrical energy storage system which can be adapted to different types of electric vehicles and which is easily assembled on the vehicle during manufacturing.

SUMMARY

An object of the present disclosure is to provide an improved modular electrical Energy Storage System for powering an electric motor in a vehicle. A further object of the disclosure is to provide an improved method for providing electrical energy to an electric motor of a vehicle and a vehicle comprising an electric motor and the modular electrical Energy Storage System for powering the electric motor.

This and other objects may be achieved by a modular electrical Energy Storage System, a method for providing electrical energy to an electric motor of a vehicle and a vehicle.

Further advantages and advantageous features of the invention are disclosed in the following description and in the dependent claims.

According to a first aspect of the invention, the present disclosure relates to a modular electrical Energy Storage System (ESS) structure for powering an electric motor in a vehicle. The modular ESS structure comprises two or more electrical energy storage modules. The modular ESS structure extends in a longitudinal direction, in a transverse direction, and in a vertical direction, the longitudinal direction coinciding with a driving direction of the vehicle. The two or more electrical energy storage modules are arranged side-by-side in the transverse direction, in the longitudinal direction, and/or in the vertical direction and are connected to each other structurally and electrically. The modular ESS structure comprises a first mounting interface comprising one or more first connecting members configured for mounting to a vehicle structure.

The two or more electrical energy storage modules may comprise an electrical connection interface configured for electrically connecting adjacent electrical energy storage modules.

One of the main challenges of electrical vehicles of today is to accommodate enough batteries to provide a satisfactory driving range. A further challenge is to increase production capacity by decreasing the assembly time in factory. One of the issues creating extending assembly time is the very large numbers of mechanical, electrical, pneumatic and cooling connections needed between electrical energy storage modules. The modular ESS structure comprising two or more electrical energy storage modules being arranged side-by-side in the transverse direction and/or in the longitudinal direction and which are connected to each other structurally and electrically according to the present disclosure provides a compact, simplified structure with a reduced complexity in terms of mechanical, electrical, pneumatic and cooling connections needed between the electrical energy storage modules.

The side walls of the electrical energy storage modules provide structural integrity, which is an advantage. The side walls of the modular ESS structure act as structural elements of the modular ESS structure. The ESS structure is provided with a first mounting interface comprising one or more first connecting members for attaching the modular ESS structure to a vehicle frame, which provides a robust fastening arrangement.

The first mounting interface may be an intermediate bracket comprising the one or more first connecting elements. The first mounting interface may comprise two or more, three or more, four or more or five or more first connecting elements.

The modular ESS structure may for example comprise three, four, five, six, seven, eight, nine or ten electrical energy storage modules.

Each of the two or more electrical energy storage modules may comprise a cooling system connection interface configured for connecting adjacent electrical energy storage modules for cooling of the two or more electrical energy storage modules. The cooling system connection interfaces may be arranged between the adjacent electrical energy storage modules with the connections passing through the respective side walls, either being side walls, as seen in the transverse, longitudinal direction and/or vertical direction. This provides protection for the connection being protected by the outer surface of the modular ESS structure. However, the cooling system connection interfaces may alternatively be arranged to extend between electrical energy storage modules with connections being arranged on outwardly facing walls of the electrical energy storage modules. The modular ESS structure may comprise a common vehicle cooling system interface, allowing the vehicle to interface with the modular ESS structure instead of with each of the electrical energy storage modules separately.

Each of the two or more electrical energy storage modules may comprise an air pressure connection interface configured for connecting adjacent electrical energy storage modules. The air pressure connection interfaces may be arranged between the adjacent electrical energy storage modules with the connections passing through the respective side walls, either being transverse or longitudinal side walls, such as inner longitudinal side walls or upper or bottom side walls, if the electrical energy storage modules are arranged side-by-side, as seen in a vertical direction. This provides protection for the connection being protected by the outer surface of the modular ESS structure. However, the air pressure connection interfaces may alternatively be arranged to extend between electrical energy storage modules with connections being arranged on outwardly facing walls of the electrical energy storage modules. The modular ESS structure may comprise a common vehicle air pressure connection interface, which reduces the amount of connections and allows the vehicle to interface with one structure only.

Each of the two or more electrical energy storage modules may be structurally connected to an adjacent electrical energy storage module via an intermediate bracket arranged in-between each adjacent electrical energy storage module and/or via direct mechanical connections between each adjacent electrical energy storage module. This implies that the modular ESS structure may use the internal structure of the electrical energy storage modules to carry the loads or they may be mounted onto separate intermediate brackets for providing an additional support. The amount of components needed and the mounting time may in each of the alternatives be reduced compared to a frame structure and a durable and space efficient structure may be provided. The intermediate brackets may act both as interface between the electrical energy storage modules as well as structural support.

The two or more electrical energy storage modules may be structurally connected to each other via a support frame. Such configuration may allow easy assembly and disassembly of the electrical energy storage modules. This is an advantage both upon assembly of the modular ESS structure and if one or several electrical energy storage modules needs maintenance or reparation after mounting it to the vehicle structure.

The support frame may comprise a bottom plate providing structural support to a bottom side of the modular ESS structure.

The support frame may comprise one or more transverse bottom members extending in the transverse direction of the modular ESS structure, the one or more transverse bottom members providing structural support to a bottom side of the modular ESS structure.

The support frame may comprise one or more side protecting members providing protection and support to a first and/or second longitudinal side of the modular ESS structure, the first and second longitudinal sides extending in the longitudinal direction of the modular ESS structure. The first and/or second longitudinal side of the modular ESS structure are thus oriented in the vehicle driving direction and the side protecting members provide protection in a direction being perpendicular to the driving direction.

A support frame provided with side protecting members may provide protection and support to a first and/or second longitudinal side of the modular ESS structure, such as upon collisions.

The modular ESS structure may comprise a common vehicle electric interface configured to connect the two or more electrical energy storage modules to the electric motor of the vehicle. This allows the vehicle to interface with the modular ESS structure instead of with each of the electrical energy storage modules separately.

The modular ESS structure may comprise a second mounting interface comprising one or more second connector elements.

The second mounting interface may be an intermediate bracket comprising the one or more second connecting elements. The second mounting interface may comprise two or more, three or more, four or more or five or more second connecting elements.

The first mounting interface may be arranged to face the second mounting interface, such that they are configured to be mounted to a respective opposite side of the vehicle structure. Such mounting arrangement may provide an enhanced structural integrity to the modular ESS structure and a robust fastening arrangement.

The modular ESS structure may be a pre-assembled modular ESS structure.

According to a second aspect, the present disclosure relates to a method for providing electrical energy to an electric motor of a vehicle, the method comprising;
  providing a modular electrical Energy Storage System structure comprising two or more electrical energy storage modules being arranged side-by-side in the transverse direction and/or longitudinal direction and being connected to each other structurally and electrically, the modular ESS structure comprising a first mounting interface comprising first connecting members configured for mounting to a vehicle structure;
  mounting the pre-assembled modular ESS structure to a vehicle structure by connecting the first mounting interface of the modular ESS structure to the vehicle structure, and;
  connecting the modular ESS structure to the electric motor of the vehicle via an common vehicle electric interface for providing electrical energy to the electric motor of the vehicle.

The modular ESS structure may be a modular ESS structure according to the first aspect.

According to a third aspect, the present disclosure relates to a vehicle comprising an electric motor and an electrical Energy Storage System (ESS) according the first aspect.

The vehicle may be a cargo transport vehicle, a truck, a bus, a recreational vehicle and a construction equipment vehicle.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
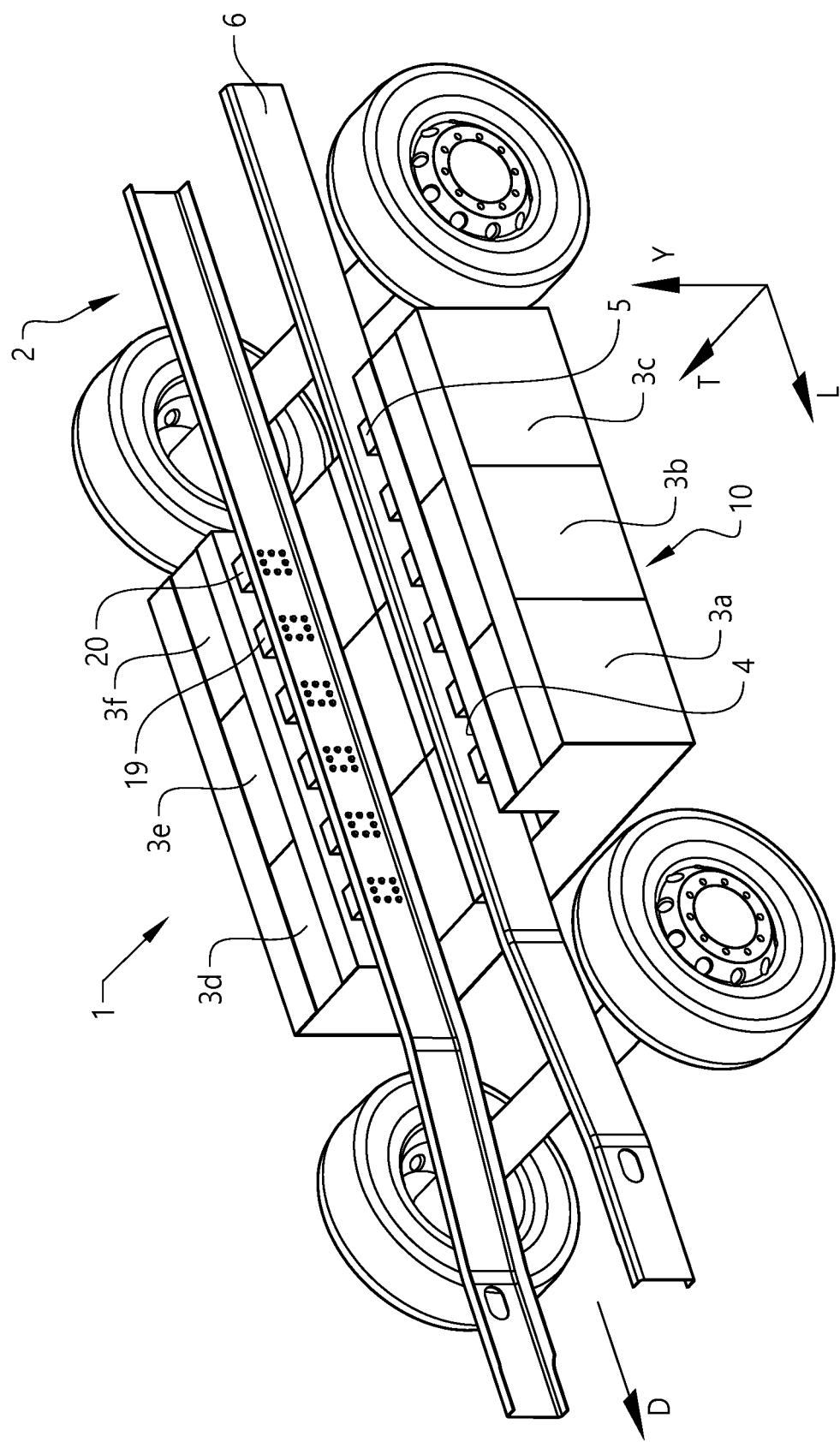
FIG. 1 is a perspective view of an electrical Energy Storage System (ESS) mounted to a vehicle structure according to the present disclosure.

It is to be understood that the present invention is not limited to the embodiments described above and illustrated in the drawings; rather, the skilled person will recognize that many changes and modifications may be made within the scope of the appended claims.

The present disclosure presents a modular electrical Energy Storage System (ESS) which can be adapted to different energy capacity needs and vehicle frame geometries. The proposed modular ESS is scalable in that it comprises electrical energy storage modules which can be assembled as needed into a suitable modular ESS structure having physical dimensions to fit a given vehicle frame, while providing required electrical power and energy capacity.

FIG. 1 is a schematic illustration of a vehicle 2 having a modular electrical Energy Storage System (ESS) structure 1 mounted to a vehicle structure 6 of the vehicle 2. The modular electrical ESS structure 1 is mounted to the vehicle 1 for powering an electric motor in the vehicle 2. The modular ESS structure 1 comprises a plurality of electrical energy storage modules 3a,3b,3c,3d,3e,3f. The number of modules determine the electrical energy storage capacity and a required capacity can be obtained by selecting a suitable number of modules for the intended vehicle.

The modular ESS structure 1 extends in a longitudinal direction L, in a transverse direction T and in a vertical direction Y, as seen when the modular ESS structure is mounted to a vehicle positioned on a flat horizontally extending surface. The longitudinal direction L coincides with a driving direction D of the vehicle 2. The electrical energy storage modules 3a,3b,3c,3d,3e,3f are arranged side-by-side. The electrical energy storage modules 3a,3b,3c,3d, 3e,3f each comprises first and second opposite transverse side walls, with at least one of the first and second transverse side walls arranged to face a transverse side wall of adjacent modules and to provide structural integrity of the modular electrical ESS structure 1. In this figure, the electrical energy storage modules 3a,3b,3c,3d,3e,3f are arranged in two rows, as seen in the longitudinal direction L, a first row including the electrical energy storage modules 3a,3b,3c and the second row including the electrical energy storage modules 3d,3e,3f. The electrical storage module 3a is arranged such that an inner longitudinal side wall thereof faces an inner longitudinal side wall of the electrical storage module 3d, the electrical storage module 3b is arranged such that an inner longitudinal side wall thereof faces an inner longitudinal side wall of the electrical storage module 3e and the electrical storage module 3c is arranged such that an inner longitudinal side wall thereof faces an inner longitudinal side wall of the electrical storage module 3f. Hence, each of the electrical energy storage modules 3a,3b,3c,3d,3e,3f are arranged side-to-side with at least two of the other the electrical energy storage modules 3a,3b,3c,3d,3e,3f.

The electrical energy storage modules 3a,3b,3c,3d,3e,3f are built by battery cells, multiple battery cells are stacked forming a battery module and multiple battery modules are then stacked forming the electrical energy storage modules 3a,3b,3c,3d,3e,3f. The electrical energy storage modules 3a,3b,3c,3d,3e,3f may furthermore each include a battery management system. The electrical energy storage modules 3a,3b,3c,3d,3e,3f may be connected in series or in parallel. The electrical connection between the electrical energy storage modules may be configurable between serial electrical connection of electrical energy storage modules and parallel electrical connection electrical energy storage modules. This means that the output voltage of the ESS structure is selectable by configuration of the connection, which is an advantage. For instance, two electrical energy storage modules may be configured in series to double the output voltage, or in parallel to maintain the voltage of the individual modules.

The modular ESS structure 1 comprises a first mounting interface 4 comprising a plurality of first connecting members 5 configured for mounting to the vehicle structure 6 and a second mounting interface 19 comprising a plurality of second connector elements 20 configured for mounting to the vehicle structure 6. The electrical energy storage modules 3a,3b,3c,3d,3e,3f are each mechanically connected to an adjacent electrical energy storage modules 3a,3b,3c,3d, 3e,3f. In this FIG. 1, the electrical energy storage modules 3a,3b,3c,3d,3e,3f are structurally connecter to each other via a support frame 10. The modular ESS structure may however also or alternatively be mechanically connected to each other between each adjacent electrical energy storage module 3a,3b,3c,3d,3e,3f, such as for example via intermediate brackets arranged in-between each adjacent electrical energy storage modules 3a,3b,3c,3d,3e,3f and/or via direct mechanical connections between each adjacent electrical energy storage module 3a,3b,3c,3d,3e,3f. Intermediate brackets arranged between each adjacent electrical energy storage modules 3a,3b,3c,3d,3e,3f may be secured to the side walls of the electrical energy storage modules 3a,3b, 3c,3d,3e,3f. The walls of the electrical energy storage modules 3a,3b,3c,3d,3e,3f may be made of a structurally supporting material, such as hard plastic or metal. Such structurally supporting material makes the modular structure robust, with a high tolerance to some mechanical stress. The structurally supporting side walls may provide collision protection, which protects electrical energy storage modules from mechanical stress during a collision.

Figure 2:
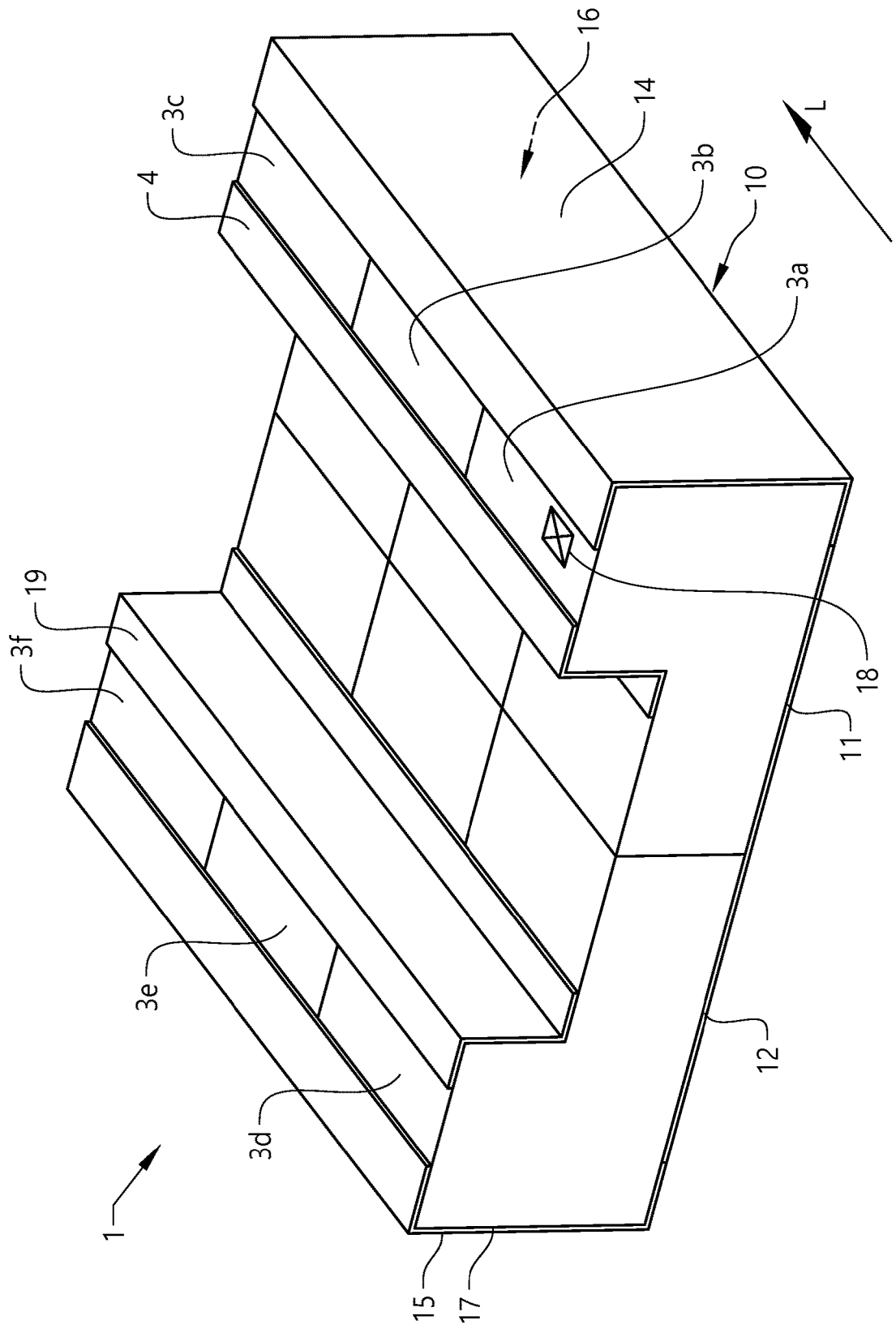
FIG. 2 is a perspective view of an electrical Energy Storage System according to the present disclosure.

FIG. 2 is a schematic illustration of the modular ESS structure 1 according to the present disclosure comprising electrical energy storage modules 3a,3b,3c,3d,3e,3f. The modular ESS structure comprises a first longitudinal side 16 and a second longitudinal side 17, extending in the longitudinal direction L. The modular ESS structure also comprises a bottom side 12. The electrical energy storage modules 3a,3b,3c,3d,3e,3f are structurally connected by means of a support frame 10. The support frame 10 comprises a bottom plate 11 providing structural support to the bottom side 12 of the modular ESS structure 1. The support frame 10 further comprises side protecting members 14,15 providing protection and support to the first and second longitudinal sides 16,17 of the modular ESS structure 1. The electrical energy storage modules 3a,3b,3c,3d,3e,3f are also connected to each other electrically with electrical connection interfaces between the adjacent modules 3a,3b,3c,3d, 3e,3f. The modular ESS structure 1 furthermore comprises a common vehicle electric interface 18 configured to connect the electrical energy storage modules 3a,3b,3c,3d,3e,3f to the electric motor of the vehicle 2. This means that there is a common electrical contact between the modular ESS structure 1 with respect to the electrical motor of the vehicle 2 (not shown). This simplifies the design of the vehicle and is advantageous in terms of space and mounting of the modular ESS structure 1.

For facilitated connection to a vehicle structure 6, the pre-assembled modular ESS structure 1 is provided with a first mounting interface 4 and a second mounting interface 19, the mounting interfaces 4,19 are provided on opposing sides of the modular ESS structure 1 and are facing each other. The first and second mounting interfaces 4,19 comprise connecting members configured for mounting to a vehicle structure.

Figure 3:
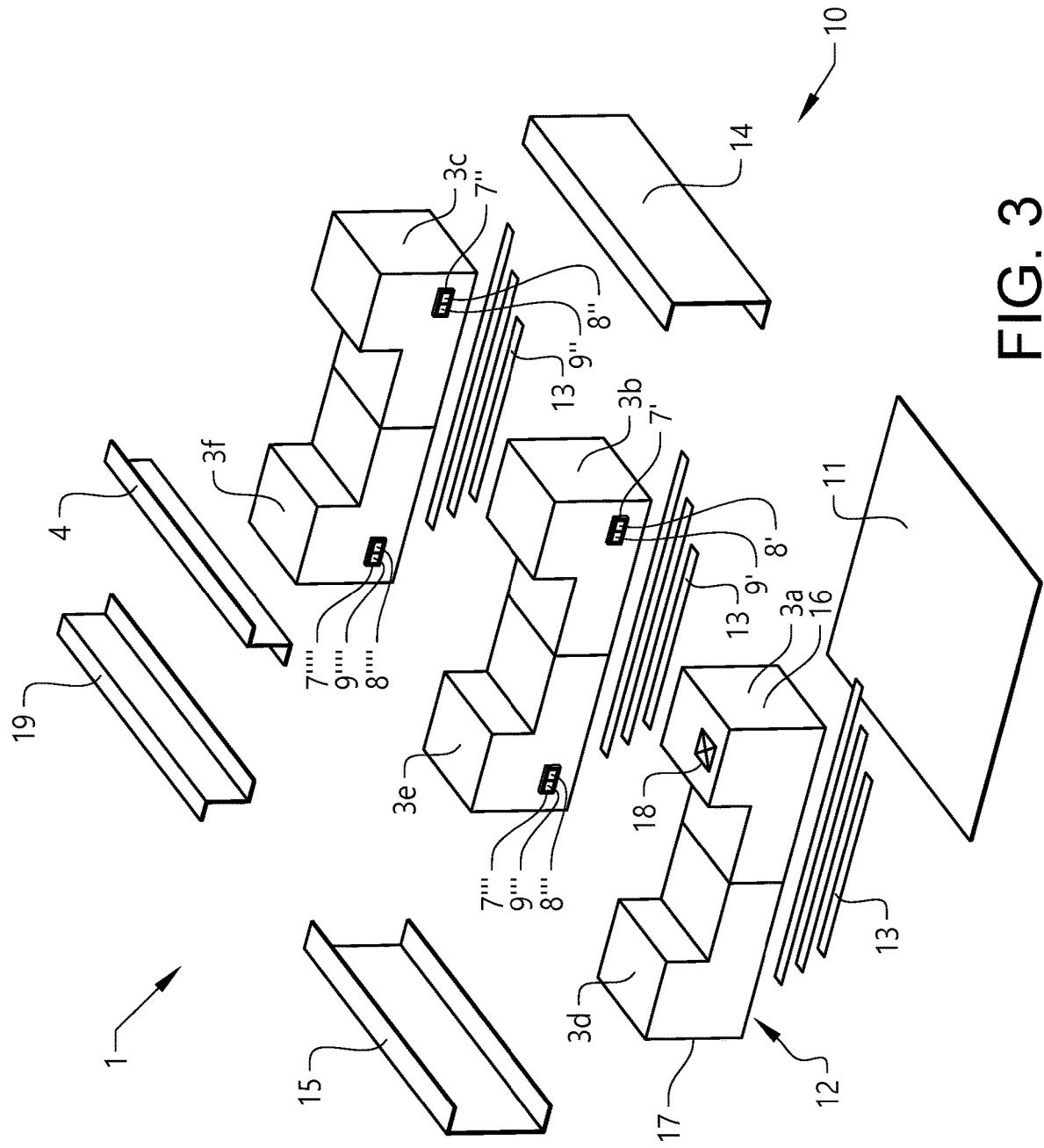
FIG. 3 is an exploded view of the electrical Energy Storage System illustrated in FIG. 2.

FIG. 3 is an exploded view of the modular ESS structure 1 from FIG. 2. As illustrated in this figure, the modular ESS structure 1 comprises six electrical energy storage modules 3a,3b,3c,3d,3e,3f. The electrical energy storage modules 3a,3b,3c,3d,3e,3f are structurally connected via a frame 10. The support frame 10 comprises the bottom plate 11 extending under the entire bottom side 12 of the modular ESS structure 1 and providing structural support to the bottom side 12. Between the bottom plate 11 and the bottom side 12 of the modular ESS structure a plurality of transverse bottom members 13 extend in the transverse direction of the modular ESS structure 1 for providing, the two or additional structural support to the bottom side 12 of the modular ESS structure 1. The support frame 10 further comprises the side protecting members 14,15 providing protection and support to the first and second longitudinal sides 16,17 of the modular ESS structure 1 in a direction perpendicular to the driving direction of the vehicle (shown in FIG. 1).

The electrical energy storage modules 3a,3b,3c,3d,3e,3f are furthermore connected to each other electrically with electrical connection interfaces 7',7'',7''',7'''' between the adjacent modules 3a,3b,3c,3d,3e,3f. The electrical energy storage modules 3a,3b,3c,3d,3e,3f further comprises cooling system connection interfaces 8',8'',8''',8'''' configured for connecting the adjacent electrical energy storage modules 3a,3b,3c,3d,3e,3f for cooling of the electrical energy storage modules 3a,3b,3c,3d,3e,3f.

The electrical energy storage modules 3a,3b,3c,3d,3e,3f further comprises air pressure connection interface 9',9'',9''', 9'''' configured for connecting the adjacent electrical energy storage modules 3a,3b,3c,3d,3e,3f.

The modular ESS structure 1 furthermore comprises a common vehicle electric interface 18 configured to connect the electrical energy storage modules 3a,3b,3c,3d,3e,3f to the electric motor of the vehicle 2, this means that there is a common electrical contact between the modular ESS structure 1 with respect to the electrical motor of the vehicle. This simplifies the design of the vehicle and is advantageous in terms of space and mounting of the modular ESS structure 1.

The invention claimed is:

1. A pre-assembled modular electrical Energy Storage System structure for powering an electric motor in a vehicle, the modular ESS structure comprising two or more electrical energy storage modules, the modular ESS structure extending in a longitudinal direction, in a transverse direction and in a vertical direction, the longitudinal direction coinciding with a driving direction of the vehicle, characterized in that the two or more electrical energy storage modules are arranged side-by-side in the transverse direction and/or in the longitudinal direction and are connected to each other structurally and electrically, that the modular ESS structure comprises a first mounting interface comprising one or more first connecting members configured for mounting to a vehicle structure, that each of the two or more electrical energy storage modules is structurally connected to an adjacent electrical energy storage module via direct mechanical connections between each adjacent electrical energy storage module, and that the pre-assembled modular ESS structure is provided with a support frame structurally connecting the electrical energy storage modules to each other.

2. The modular ESS structure according to claim 1, wherein each of the two or more electrical energy storage modules comprises an electrical connection interface configured for electrically connecting adjacent electrical energy storage modules.

3. The modular ESS structure according to claim 1, wherein each of the two or more electrical energy storage modules comprises a cooling system connection interface configured for connecting adjacent electrical energy storage modules for cooling of the two or more electrical energy storage modules.

4. The modular ESS structure according to claim 3, wherein the modular ESS structure comprises a common vehicle cooling system interface.

5. The modular ESS structure according to claim 1, wherein each of the two or more electrical energy storage modules comprises an air pressure connection interface configured for connecting adjacent electrical energy storage modules.

6. The modular ESS structure according to claim 5, wherein the modular ESS structure comprises a common vehicle air pressure connection interface.

7. The modular ESS structure according to claim 1, wherein the support frame comprises a bottom plate providing structural support to a bottom side of the modular ESS structure.

8. The modular ESS structure according to claim 1, wherein the support frame comprises one or more transverse bottom members extending in the transverse direction of the modular ESS structure, the one or more transverse bottom members providing structural support to a bottom side of the modular ESS structure.

9. The modular ESS structure according to claim 1, wherein the support frame comprises one or more side protecting members providing protection and support to a first and/or second longitudinal side of the modular ESS structure, the first and second longitudinal sides extending in the longitudinal direction of the modular ESS structure.

10. The modular ESS structure according to claim 1, wherein the modular ESS structure comprises a common vehicle electric interface configured to connect the two or more electrical energy storage modules to the electric motor of the vehicle.

11. The modular ESS structure according to claim 1, wherein the modular ESS structure comprises a second mounting interface comprising one or more second connector elements.

12. The modular ESS structure according to claim 11, wherein the first mounting interface is arranged to face the second mounting interface, such that they are configured to be mounted to a respective opposite side of the vehicle structure.

13. A vehicle comprising an electric motor and an electrical Energy Storage System according to claim 1.

14. A method for providing electrical energy to an electric motor of a vehicle, the method comprising the steps of;

providing a modular electrical Energy Storage System structure comprising two or more electrical energy storage modules being arranged side-by-side in the transverse direction and/or longitudinal direction and being connected to each other electrically and structurally such that each of the two or more electrical energy storage modules is structurally connected to an adjacent electrical energy storage module via direct mechanical connections between each adjacent electrical energy storage module, the modular ESS structure being provided with a support frame structurally connecting the electrical energy storage modules to each other, and the modular ESS structure comprising a first mounting interface comprising first connecting members configured for mounting to a vehicle structure;

mounting the pre-assembled modular ESS structure to a vehicle structure by connecting the first mounting interface of the modular ESS structure to the vehicle structure, and;

connecting the modular ESS structure to the electric motor of the vehicle via a common vehicle electric interface for providing electrical energy to the electric motor of the vehicle.

\* \* \* \* \*